United States Patent
Halterman, Jr.

(10) Patent No.: US 6,243,982 B1
(45) Date of Patent: Jun. 12, 2001

(54) SPINNER FOR SPINNING LURES (76) Inventor: Danny R. Halterman, Jr., 15115 Hwy. 187, Eureka Springs, AR (US) 72632

( * ) Notice: Subject to any disclaimer, the term of this patent is extended or adjusted under 35 U.S.C. 154(b) by 0 days.

(21) Appl. No.: 09/526,265

(22) Filed: Mar. 16, 2000

(51) Int. Cl.$^7$ .................................................. A01K 85/12
(52) U.S. Cl. ...................... 43/42.21; 43/42.2; D22/131; D21/458; 446/217
(58) Field of Search ............................ 43/42.19, 42.2, 43/42.21, 42.32, 42.33, 42.11, 42.13; D22/129–131; D21/458; 446/217

(56) References Cited

U.S. PATENT DOCUMENTS

| | | | |
|---|---|---|---|
| 104,930 | * | 7/1870 | Chapman ............................... 43/42.2 |
| D. 148,254 | * | 12/1947 | Rooke ................................. D22/129 |
| 149,123 | * | 3/1874 | Hazzard ................................ 43/42.2 |
| 323,111 | | 7/1885 | Chapman ............................ 43/42.12 |
| D. 323,696 | | 2/1992 | Gentry ................................ D22/129 |
| D. 381,061 | | 7/1997 | Graham .............................. D22/129 |
| 536,185 | * | 3/1895 | Cook ..................................... 43/42.2 |
| 614,411 | * | 11/1898 | Rockwood ............................ 43/42.2 |
| 646,916 | * | 4/1900 | Pflueger ............................... 43/42.2 |
| 755,612 | * | 3/1904 | Burdett ................................. 43/42.2 |
| 784,398 | * | 3/1905 | Heckeler ............................... 43/42.2 |
| 849,743 | | 4/1907 | Martin ................................ 43/42.14 |
| 869,565 | * | 10/1907 | Haverly ................................ 43/42.2 |
| 1,265,900 | | 5/1918 | Foss ................................... 43/42.17 |
| 1,503,901 | | 8/1924 | Jones ................................. 43/42.14 |
| 1,617,318 | | 5/1927 | Brown .................................. 43/42.2 |
| 1,627,637 | * | 5/1927 | Dahlquist ............................. 43/42.2 |
| 1,682,710 | * | 8/1928 | Pflueger .............................. 43/42.13 |
| 1,797,234 | * | 3/1931 | Jordan .................................. 43/42.2 |
| 1,870,767 | | 8/1932 | Brown ................................ 43/42.29 |
| 1,871,971 | * | 8/1932 | Eppich ................................. 43/42.2 |
| 1,943,283 | | 1/1934 | Beil ..................................... 43/42.2 |
| 2,471,499 | * | 5/1949 | Shipman ............................ 43/42.13 |
| 2,493,431 | | 1/1950 | Wold .................................. 43/42.2 |
| 2,493,692 | * | 1/1950 | Pareti et al. ....................... D22/131 |
| 2,497,807 | | 2/1950 | Wood ................................... 43/42.2 |
| 2,610,429 | | 9/1952 | Thomas .............................. 43/42.17 |
| 2,722,079 | | 11/1955 | Johnson ............................. 43/42.14 |
| 2,835,999 | | 5/1958 | Gillilan .............................. 43/26.2 |
| 3,127,694 | | 4/1964 | Davis ................................. 43/42.19 |
| 3,245,171 | | 4/1966 | Henry .................................. 43/42.1 |
| 3,439,443 | | 4/1969 | Weimer .............................. 43/42.12 |
| 4,016,671 | | 4/1977 | Larsen ............................... 43/42.17 |
| 4,099,343 | | 7/1978 | Enz ................................... 43/42.19 |
| 4,201,007 | | 5/1980 | Backstrom ......................... 43/42.12 |
| 4,382,345 | | 5/1983 | Bassett .............................. 43/42.17 |

(List continued on next page.)

FOREIGN PATENT DOCUMENTS

| | | | | |
|---|---|---|---|---|
| 625507 | * | 8/1927 | (FR) | ............................. 43/42.19 |
| 648475 | * | 12/1928 | (FR) | ............................. 43/42.19 |
| 748370 | * | 7/1933 | (FR) | ............................... 43/42.2 |
| 904708 | * | 11/1945 | (FR) | ............................... 43/42.2 |
| 930161 | * | 1/1948 | (FR) | ............................... 43/42.2 |
| 988133 | * | 8/1951 | (FR) | ............................. 43/42.19 |
| 992492 | * | 10/1951 | (FR) | ............................. 43/42.19 |
| 407479 | * | 3/1934 | (GB) | ............................... 43/42.2 |
| 421046 | * | 5/1947 | (IT) | ............................. 43/42.19 |
| 539524 | * | 2/1956 | (IT) | ............................. 43/42.19 |
| 11-46629 | * | 2/1999 | (JP) | . |

Primary Examiner—Darren W. Ark
(74) Attorney, Agent, or Firm—Mark Rogers; Gary N. Speed (57) ABSTRACT

A spinner shape (10) cut and formed to resemble a small bait fish which exhibits rotation (40) in moving air or water as a result of action against the broad surfaces of the tail fin plates (24) and the internal broad surfaces of the spinner bodies (28). The spinner shape is then journaled on a shaft (32) through center hole (14) and adjoined tab holes (12) for assembly as an in-line spinning lure (30), or is adjoined at the opposite ends with a split ring (46) to be attached by way of a swivel (50) to a "V" frame spinner bait (48) or to a jig spinner (49).

3 Claims, 4 Drawing Sheets

U.S. PATENT DOCUMENTS

| | | |
|---|---|---|
| 4,447,980 | 5/1984 | Bassett ................................ 43/42.14 |
| 4,501,086 * | 2/1985 | Bunce .................................. 43/42.2 |
| 4,637,158 | 1/1987 | Reid .................................... 43/42.19 |
| 4,718,191 | 1/1988 | Gentry ................................ 43/42.13 |
| 4,800,669 | 1/1989 | Charrow ............................. 43/42.19 |
| 4,819,362 * | 4/1989 | Lewis .................................. 43/42.2 |
| 4,831,765 * | 5/1989 | Bradshaw ........................... 43/42.32 |
| 4,888,908 | 12/1989 | Morris ................................. 43/42.14 |
| 4,936,041 | 6/1990 | Couture ............................... 43/42.15 |
| 5,016,386 | 5/1991 | Lamonica et al. .................. 43/42.14 |
| 5,138,789 | 8/1992 | Hood ................................... 43/42.13 |
| 5,245,781 | 9/1993 | Helmuth .............................. 43/42.2 |
| 5,481,821 | 1/1996 | Stanley ................................ 43/42.13 |
| 6,073,384 * | 6/2000 | Schlaegel ............................ D22/129 |
| 6,108,961 * | 8/2000 | Milawski et al. ................... 43/42.19 |

* cited by examiner

SPINNER FOR SPINNING LURES

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to spinning lures and spinner blades as are used in sportfishing, in particular a hydrodynamically efficient new design that improves the performance of spinner baits, jig spinners and so called "in-line" spinning lures, as are used for numerous species of game fish.

Conventional spinner blades, such as those designated by the names "Colorado", "Indiana", "French", and others, are well known and widely utilized in the fishing lure manufacturing industry. Numerous styles and sizes of spinning lures are currently manufactured utilizing these spinner blades. They include a broad range of spinner baits for black bass, jig spinners of all sizes for attachment to fishing jigs, and in-line spinners for species from sunfish and trout to large fresh and saltwater species.

Spinning lures are generally of two basic styles. One of the styles is represented by spinner baits and jig spinners. These lures are rigged with a "V" shaped wire harness, one example of which is described in U.S. Pat. No. 4,888,908 to Morris in 1989. One end of the wire is attached to a jig with a skirt, and the other end has a spinner attached by way of a swivel. The casting line is affixed at the point of the "V". This form of spinner attachment permits the spinner to freely spin or twirl in a circle, independent of the rest of the lure. As is described in Morris, more than one spinner blade may be attached to the lure. Jig spinners differ from spinner baits only in that the jig portion of the lure is interchangeable by way of a safety pin type of attachment, while the jig portion of a spinner bait is usually attached permanently and rigidly to one end of the wire shape.

The other basic style of spinning lure is called an in-line spinner. This type of spinning lure is assembled on a stright piece of wire. One end of the wire has a loop to which is attached the casting line and the other end of the wire is attached to a hook. Along the shaft of the straight wire, a spinner is journaled in such a manner that it will spin around the wire. Various beads may also be journaled on the shaft to provide casting weight, flash, and to facilitate the function and effectiveness of the lure.

While the conventional spinner blades commonly utilized in both of these lure styles are numerous in sizes and shapes, they are all still basically the same in design; that is, they are primarily a shaped disc which is convex when viewed from one broad side and concave when view from the opposite broad side. Typically, the blade is attached to the spinning lure at its longitudinal apex by way of a hole in the blade.

The concave/convex nature of the blades causes them to rotate or spin when operatively affixed to a fishing lure and pulled through the water. The reason these spinner blades are effective in attracting fish and causing them to strike is essentially unknown, but it is widely conjectured that the response is triggered by flash, vibration, sound, movement, or numerous other attributes of the specific assembly. Regardless of what makes spinners effective, they are widely and successfully used.

In addition to the conventional concave/convex spinner blades, numerous other blades have been invented to specifically address other needs. One such blade in common use today is the "buzz" blade. (U.S. Pat. No. 1,943,283 to B. D. Beil in 1931) This blade is commonly used in many embodiments to create a spinner bait which will "buzz" across the surface of the water when retrieved rapidly, thus causing considerable splash and attracting bass to strike aggressively. The blades differ functionally from conventional spinner blades in that they will spin when retrieved only partially submerged in the water, whereas conventional blades, such as a Colorado or Indiana blade will not. These blades are journaled on a wire shaft and are therefore fixed in their orientation on the spinning lure. While that orientation does facilitate their function for buzzing, it inhibits their function for other styles of presentations. Therefore, it has not been possible to fish a spinning lure which would be effective at both buzzing and fishing slowly, also descriptively termed "slow-rolling".

Other distinctive designs have been created which are being used today as spinners on spinner baits or jig spinners. On such design is U.S. Pat. No. D323,696 to Gentry in 1989. This blade is known to spin in a large radius, producing a thumping action to the spinner bait.

Another is U.S. Pat. No. 5,481,821 to Stanley in 1996. This blade is constructed of thicker material at the end distal to the point of attachment, thus creating greater vibration when spinning.

In-line spinners have been the subject of much innovation throughout this century, though most have not been of a practical design or marketably developed. Of particular relevance to the instant invention, U.S. Pat. No. 323,111 to Chapman in 1885, describes a trolling-bait of a "fish-shaped" design. The design and construction of this spinning lure was complex, requiring the precise assembly of many pieces of shaped material. A special propeller shaped fin had to be incorporated into the body of the design to facilitate revolving when trolled through the water. The lure also did not exhibit an accurate fish-shaped or styled profile which would permit accurate bait fish indicia to be installed on its sides. While different sizes of this lure could have been produced, it would not have been possible to change the casting weights by adding weighted beads, without significantly effecting the lures spinning efficiency. Therefore, it would not have been applicable to a broad range of fish or fishing conditions.

In light of the above discussion, it is apparent that the prior art can still be improved and suffers from the following disadvantages:

Conventional spinner blades require a minimum retrieval speed to spin. That speed may be too fast for some "slow-roll" techniques applicable to fish that require a slow presentation to draw a strike.

In-line spinners utilizing conventional spinner blades will not buzz when retrieved rapidly, will not spin predictably when fished very slow, will not spin while falling on a loose line after casting, are notoriously known to hang up easily on limbs or other underwater obstructions due to the exposed hooks, generally resulting in loss of the lure, and cannot be fished vertically in a "jigged" fashion since they will frequently invert in their orientation and entangle the casting line in the hook rendering them useless for hooking a fish.

Conventional spinner blades are generally heavy since they are made from thick metal in the range of 0.020 to 0.030 inch. The thick metal prevents the blades from becoming deformed with use and makes them less likely to spin at slow retrieval speeds.

Conventional spinner blades do not resemble the shape of a baitfish when spinning and do not resemble the shape of a baitfish when not spinning. Further, they can not be marked with bait fish indicia to make them realisically resemble a bait fish.

Conventional spinner blades will not "buzz" the surface when retrieved rapidly, since they will not spin when the bait to which they are attached is partially out of the water. Likewise, due to their rigid orientation on the bait, buzz blades will not permit a slow-roll fishing presentation and will not spin while falling through the water column after casting.

Conventional spinner blades are unpredictable and likely to stop spinning with the slightest interference from grass, moss, algae, or submergered twigs. Once the spinning action is stopped, it may be difficult to start spinning again until recasting the lure.

Conventional spinner blades frequently do not create a tug against the line due to resistance with the water while they are spinning, thus making it difficult to have a "feel" for the lure or for the strike of a fish.

Conventional spinner blades will not predictably spin or flutter while the lure is simply falling through the water column after the cast, that is, they require the forward motion of retrieval to create a spinning action.

It is well known that fish become sensitized to specific lures after having seen many of them over a long period of time. Conventional spinner blades have been around for a long time and fish are likely sensitized to their appearance and presence.

As this would indicate, a spinner blade has been needed for spinner baits, jig spinners, and in-line spinning lures which is more hydrodynamically efficient, lighter in weight, more predictable in performance, will spin at a slower speed, and produce a better feel for the lure and a fish strike. Further, it is desireable to have an spinner that actually resembles a bait fish in shape, indicia and performance. It is also desireable to have a spinner blade that will function well at both extremes of retrieval, that is, it will buzz and slow-roll, all in one lure. It is also desirable to have a in-line spinner that will buzz, spin and flutter on the fall, permit vertical jigging, and will not likely hang up on underwater structures. In addition, conventional spinner blades have been used so extensively that fish have become sensitized to their presence and may not strike them as readily. This phenomenon has been witnessed many times in the fishing world with the coming and going of lures. A new design is always readily accepted by fish and fishermen when new, thus a steady influx of new designs is crucial to the angling sport and manufacturing industry.

BRIEF SUMMARY OF THE INVENTION

Accordingly, the present invention has several objects and advantages:

The new spinner blades of the present invention will spin at a slower retrieval speed than conventional spinner blades, thus permitting "slow-roll" techniques to fish that require a slow presentation to draw a strike.

In-line spinning lures utilizing the new spinner blades will buzz when rapidly retrieved, will spin predictably when fished slowly, will spin and flutter on the fall, tend not to hang-up when retrieved through underwater structure and obstructions, and can be vertically "jigged" effectively without entanglement with the casting line.

The new spinner blades may be manufactured from thinner metal than conventional spinner blades without sacrificing structural integrity due to the bending and curvilinear shape. Therefore they can be lighter and more efficient spinners.

The new spinner blades resemble the actual shape of a bait fish when spinning and when not spinning, can be marked with authentic baitfish indicia, and when spinning, present the bait fish indicia in repetitive, strobe-like images as it revolves.

The new spinner blades make it possible to achieve both presentations, "buzz" and "slow-roll, with the same lure.

The spinning function of the new spinner blades is predictable and not as effected by interference from moss, algae, grass, or twigs.

The new spinner blades produce a pleasant tug against the line, thus making for better feel of the lure and the strike of a fish.

The new spinner blades will spin predictably while the lure is falling through the water column after a cast. In addition, while the lure is falling through the water, the spinner will flutter, mimicking a wounded bait fish.

The new spinner blades make possible a new appearance to which fish have not become sensitized by years of fishing. Many shapes, sizes and contours are possible with the new blades which resemble the shapes of many different types of baitfish from very skinny to very fat. Therefore, lures can be designed to match very specific fishing needs.

These and other objects and advantages of the present invention, along with features of novelty apurtenent thereto, will appear or become apparent in the course of the following descriptive sections.

BRIEF DESCRIPTION OF THE SEVERAL VIEWS OF THE DRAWINGS

In the drawings, closely related figures have the same number but different alphabetic suffixes.

REFERENCE NUMERALS IN DRAWINGS

| 10 | spinner shape | 48 | "V" frame spinner bait |
| 12 | tab holes | 49 | jig spinner |
| 14 | center hole | 50 | swivel |
| 16 | tail fin bends | 52 | spinner shape |
| 18 | bead plate bends | 54 | in-line spinning lure |

-continued

| 20 | tab bends | 56 | spinner shape |
| 22 | tabs | 57 | spinner shape |
| 24 | tail fin plate | 58 | "V" frame spinner bait |
| 26 | bead plate | 60 | spinner shape |
| 28 | spinner bodies | 62 | bead plate bends |
| 30 | in-line spinning lure | 64 | fin plate bends |
| 32 | spinner shaft | 66 | tab bends |
| 34 | line connecting eyelet | 68 | center hole |
| 36 | hook | 70 | tab holes |
| 38 | beads | 72 | tabs |
| 40 | rotation | 74 | spinner shaft |
| 42 | spinner shape | 76 | in-line spinning lure |
| 44 | mid-line bend | 78 | swivel |
| 46 | split ring | 80 | "V" frame spinner bait |

DETAILED DESCRIPTION OF THE PREFERRED EMBODIMENT

The spinner blades may be manufactured from any thin material which resists bending and tends to retain its shape; such as, stainless steel, titanium, some aluminum, brass, other metals, and various plastics, all available from MSC Industrial Supply Company of Melville, N.Y. The preferred material is stainless steel in thickness ranging from less than 0.001 inch for small embodiments to any thickness which can be cut and formed into the desired shape. The most practical thickness for performance, as well as cutting and forming, ranges between 0.003 and 0.010 inch. All other materials used in the assembly of in-line spinners and spinner baits are easily acquired from a variety of companies that supply such components, one such company being Hagen's of Mitchell, S. Dak.

FIGS. 1A to 1D depict aspects of a preferred embodiment of the present invention as may be utilized for assembly of an in-line spinning lure.

Figure 1A:
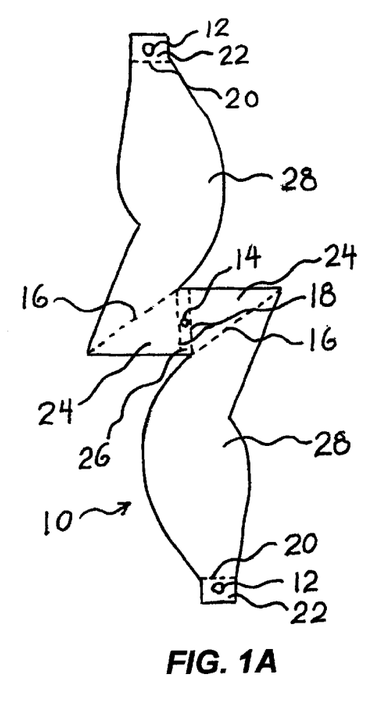
FIGS. 1A to FIGS. 1D depict various aspects of a preferred embodiment of the present invention as may be utilized for in-line spinning lures.

FIG. 1A depicts a spinner shape 10 cut from the desired material and shaped and finished to resemble a small bait fish 30. Tab holes 12 and a center hole 14 are punched or drilled. The spinner shape 10 is then bent along angles at tail fin bends 16, bead plate bends 18, and tab bends 20. As the spinner shape 10 is shown in FIG. 1A, bead plate bends 18 and tab bends 20 are made in the direction toward the viewer and tail fin bends 16 are made in the direction away from the viewer.

Figure 1B:
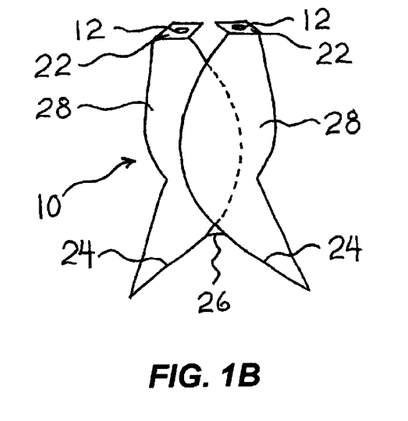
Figure 1C:
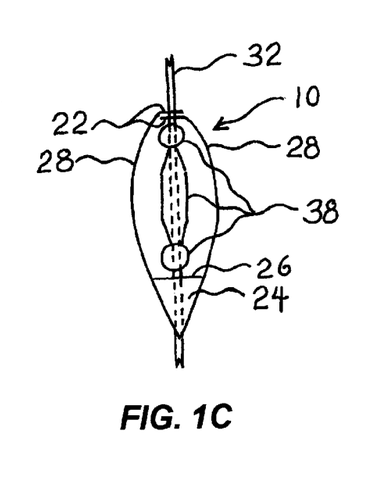

FIGS. 1B and 1C are views of the spinner shape 10 after bending. FIG. 1B is viewed in a plane parallel to the broad surfaces of tail fin plates 24, bead plate 26, and approximately perpendicular to the broad surfaces of the spinner bodies 28. The tabs 22 and tab holes 12 are not operatively aligned and joined.

Figure 1D:
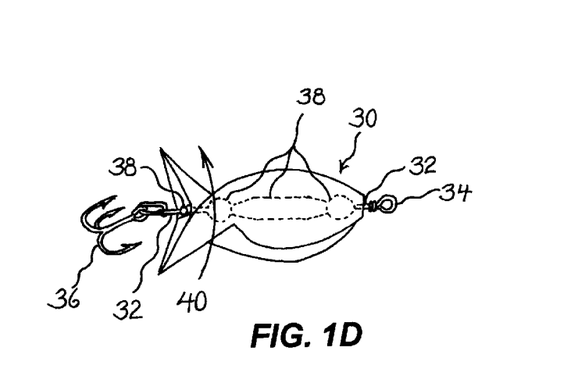

FIG. 1C is viewed in a plane parallel to the broad surfaces of the spinner bodies 28, rotated 90 degrees from FIG. 1B. FIG. 1C depicts completion of the forming by bringing the two tabs 22 operatively together at the apex and aligning the tab holes 12. The entire structure is then rotatably journaled on a spinner shaft 32 through the combined tab holes 12, and center hole 14. The tab holes 12 and center hole 14 are sufficiently larger in diameter than the spinner shaft 32 that rotation 40 is possible as is shown in FIG. 1D. The tabs 22 are operatively joined together at their flat surfaces together with gluing, spot welding, or other methods, so that the tension created in the flexed spinner body 28 does not create friction against the spinner shaft 32. A variety of beads 38 can be added to the spinner shaft 32 to enhance spinning performance, provide casting weight, and add flash and color for effectiveness.

FIG. 1D is a perspective view of the preferred embodiment of an in-line spinning lure 30 showing direction of rotation 40 upon pulling through the water. The spinner shaft 32 with beads 38 installed, is formed with a line connecting eyelet 34 for attaching a casting line and hook 36 at the opposite end.

All spinner blades are presumably designed to spin, twist, twirl, oscillate, or otherwise move in a fashion that will create vibration and flash. Conventional spinner blades are by their basic design, sometimes unpredictable and inconsistent in the way they perform these functions. The spinner blades of the present invention are predictable and consistent in the way they spin, therefore they are predictable and consistent in creating vibration and flash. By bending at the tail fin bends 16 and bead plate bends 18 and tab bends 20, it is then possible to flex the entire spinner shape 10, bringing the tabs 22 operatively together and aligning tab holes 12. It is then possible to journal the spinner onto a shaft 32, as is depicted in FIG. 1C. An aerodynamic and hydrodynamic shape is thus created which will facilitate rotation 40 when moved through the air or water. This rotation 40 is a function of air or water acting against the broad surfaces of the tail fin plates 24 and the internal broad surfaces of the spinner bodies 28. The speed of rotation 40 can be a function of the speed of retrieval of the spinning lure through the water or the speed of the air passing through it. It can also be a function of the size of broad surfaces of the tail fin plates 24, the shape and size of the internal broad surfaces of the flexed spinner bodies 28, and the degree to which the tail fin bends and 16 bead plate bends 18 are bent with respect to each other. As is apparent, infinite dimensional relationships between these elements are possible. The speed of rotation 40 is an important variable since it determines the variable qualities of both vibration and flash. Faster vibration is frequently important when fishing for some species of fish such as stripers or walleye. Flash is an important variable that is regulated to match water conditions from crystal clear to muddy. Therefore, many embodiments of the present invention are designed to specifically modify the dimensional relationships between the broad surfaces of the tail fin plates 24 and internal broad surfaces of the flexed spinner bodies 28 to achieve the appropriate vibration and flash results. Other variables such as overall size, weight, style, and color, can also have an effect on either vibration or flash, or both.

While the overall length of the in-line spinning lure 30 does not appear to have a significant effect on speed of rotation 40, it is important in creating the overall profile of a baitfish. While some baitfish are known to be long and skinny, others are short and fat. By varying the shape, size, and style, it is possible to imitate a broad range of baitfish.

Figure 3A:
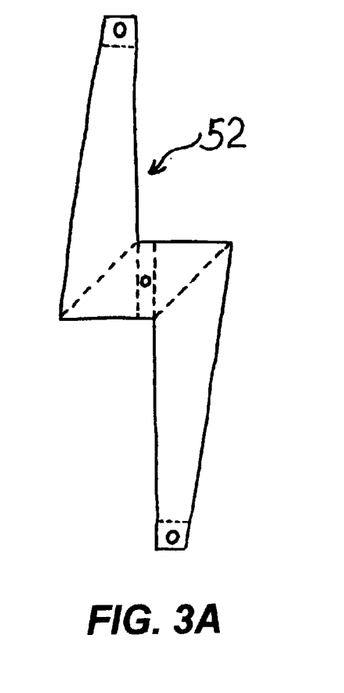
FIGS. 3A and 3B depict an alternative embodiment of the present invention as may be utilized for in-line spinning lures.
Figure 3B:
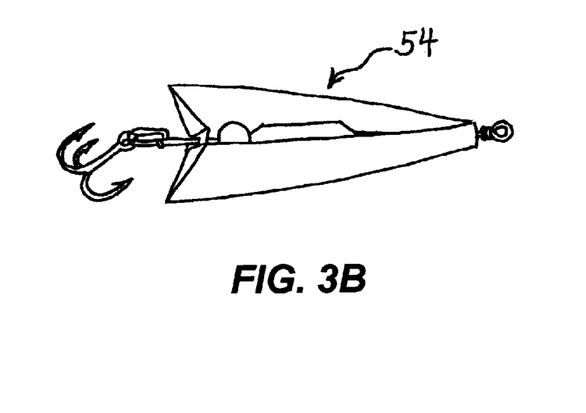

Since many embodiments of this present invention appear like a baitfish in style, shape, and color when not spinning, an unexpected result of the design is that the present invention appears shaped like a baitfish even while it is spinning, including the straight-side design of FIG. 3A and 3B. A strobe-like effect is created upon spinning due to ambient light reflection which causes the bait fish indicia to be presented in a repetitive, accurate profile, and the tail fin plates 24 to reflect light in a way that creates the impression of a fish's tail. In addition, the strobe-like effect while spinning also makes markings on the external broad surfaces of the spinner bodies 28 such as eyes, gills, scales, and fins appear as finite structures, not just a blur as might have been expected. Also very unexpectedly, it is possible to mark specific indicia on the internal broad surfaces of the spinner bodies 28 which will appear simultaneously with the indicia on the external broad surfaces of the spinner bodies 28, creating a three dimensional or holographic effect. This dramatically increases the flexibility and applications of bait fish indicia design. Various beads 38 can be placed on the spinner shaft 32 to add color, flash and weight to the lure. These beads 38 are easily visible through a rapidly spinning lure, contributing to the overall desired appearance, such as placing a red bead 38 near the head of the spinning lure to give the impression of bleeding gills. In addition, a bead 38 may be placed on the spinner shaft between the bead plate 26 and the hook 36. This bead 38 provides a free rotating surface for the bead plate 26 to spin upon, instead of against the point of attachment for the hook, thus creating less friction for the spinner.

Another unexpected result of the present invention is that the in-line spinning lure 30 will spin and flutter on the fall, that is, after the lure is cast and while it is dropping vertically through the water on a static line before retrieval is begun. Conventional in-line spinning lures that are assembled using conventional spinner blades are unable to perform this function. It was also unexpected to find that if the in-line spinning lure 30 is allowed to fall on a loose casting line after it hits the water, it will twist and turn with a swimming motion like a wounded bait fish, as well as spin. This twisting and turning motion can be facilitated by careful placement of the weighted beads 38 so that the weight of the in-line spinning lure 30 is balanced slightly forward, that is, toward the line connecting eyelet 34 end of the lure.

Upon retrieval, the in-line spinning lure 30 can be retrieved rapidly or slowly and still achieve a desirable rotation 40 for vibration and flash. If retrieved rapidly enough, the lure can be brought to the surface and made to buzz. It is not possible to get a conventional in-line spinner lure to buzz since conventional spinner blades will stop spinning when pulled even partially above the surface of the water.

Heretofore, an unfortunate feature of in-line spinners is that they are notorious to hang-up on underwater tree limbs and other obstructions. This feature is due to the trailing, unguarded, treble hook which will immediately snag anything it brushes against. It is one of the traditional in-line spinners greatest faults. The in-line spinners assembled from the present invention were surprisingly free of this tendency, even though they also have a trailing treble hook 36. It has been unexpectedly discovered that the tail fin of the present spinner acts as a guard, and while rotating, "pushes" the entire assembly away from underwater obstructions before the hook can snag. It has been observed that this feature has no effect on the fish hooking abilities of the lure, presumably because the fish hangs onto the lure long enough for hte hooks to catch.

Further experimentation and research have also revealed another very unexpected and important quality of the in-line spinner of the present invention. It is frequently desired to utilize a technique called deep jigging for fish that are located in very deep water. This requires dropping a lure vertically into the deep water and by alternatingly raising and lowering the rod tip, cause the lure to rise vertically a couple of feet and then drop back to the bottom. It is thus very important that such a lure be designed so that it gives maximum flutter on dropping, and not entangle its hooks with the casting line by inverting on the fall. If it were to entangle at that depth and the angler was unaware, then the strike of a fish will not result in a hooked fish. Heretofore, in-line spinners were not able to perform this technique though otherwise they would have been a desireable deep jigging lure. Unexpectedly, the in-line spinner of the present invention is able to deep jig without causing entanglement. This results from balancing the spinner with weighted beads so that the spinner will not turn upside down and thus cause entanglement of the hook and casting line. When properly assembled, the in-line spinner of the present invention will flutter and spin on the fall when dropped, without inverting, thus making a very effective deep jigging lure which has proven effective for a variety of fish.

FIGS. 2A to 2D depict aspects of a preferred embodiment of the present invention as may be utilized for assembly of a spinner bait or jig spinner.

Figure 2A:
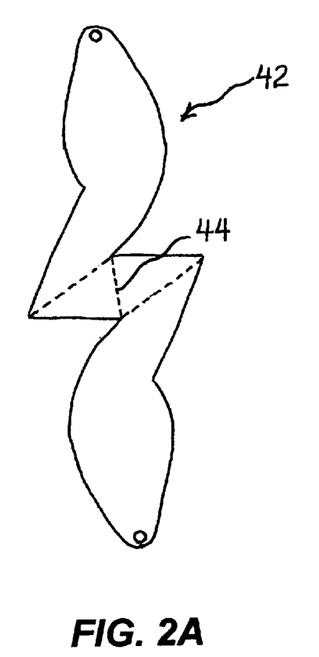
FIGS. 2A to 2E depict various aspects of a preferred embodiment of the present invention as may be utilized for spinner baits and jig spinners.
Figure 2B:
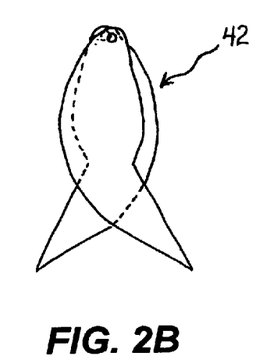
Figure 2C:
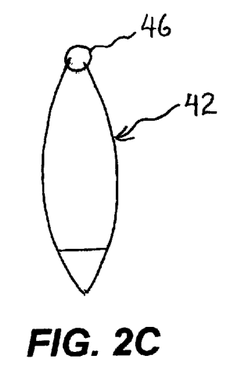
Figure 2D:
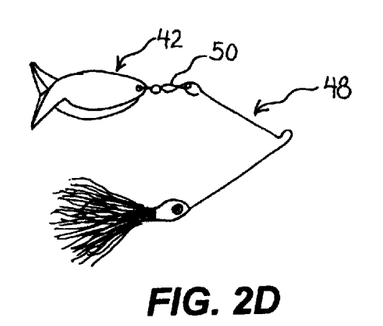
Figure 2E:
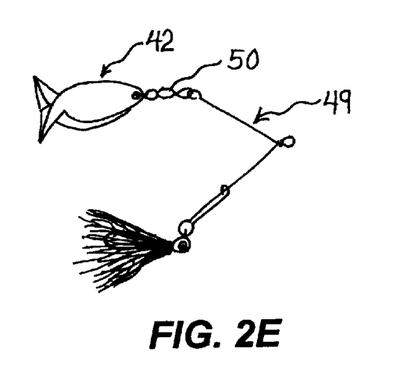

Preferred materials, and the cutting and forming of spinner shape 42 are much the same as shown is FIGS. 1A to 1C for spinner shape 10. The center hole 14 and tab bends 20 of FIGS. 1A to 1C are eliminated since this embodiment will not be journaled on a spinner shaft 32 and therefore, bead plate 26 of spinner shape 10 is not needed as a surface to rotate against a bead 38. Bead plate bend 18 in FIG. 1A is therefore altered to become an mid-line bend 44 in FIG. 2A. FIG. 2B and FIG. 2C are thus views similar to FIGS. 1B and 1C. FIG. 2C shows the final form of the spinner shape 42, flexed and operatively joined with a split ring 46 at its opposite ends. FIG. 2D shows a "V" frame spinner bait 48 with a swivel 50 and the final form of the spinner shape 42 attached, thereby permitting free rotation of the spinner shape 42 as it is pulled through the water. FIG. 2E shows a jig spinner 49 with a swivel 50 and the final form of the spinner shape 42 attached, thereby permitting free rotation of the spinner shape 42 as it is pulled through the water.

The spinner shape 42 of FIGS. 2A through 2E differs from the spinner shape 10 of FIGS. 1A through 1D primarily by the mechanism through which it is permitted to spin. Spinner shape 10 is designed to be rotatably journaled, which restricts its rotation 40 to the orientation of the spinner shaft. Spinner shape 42 is designed to be attached to a "V" framed spinner bait 48 or jig spinner 49 by way of a swivel 50 which permits unrestricted rotation 40 in all directions, irrespective of the orientation of the rest of the lure. Therefore, the spinner shape 42 will freely rotate on the fall as well as when retrieved.

An unexpected result of this design is that the "V" framed spinner bait 48 of FIG. 1D and the jig spinner 49 of FIG. 1E can be brought to the surface and made to buzz when retrieved rapidly enough. It is not possible to get a conventional spinner bait or jig spinner to buzz since conventional spinner blades will stop spinning when pulled even partially from the water. In addition, it is also possible with these embodiments to fish a slow-roll presentation when retrieved very slowly.

The spinner shape 42 also offers another distinct advantage over conventional spinner blades. While conventional spinner blades can offer flash and vibration within their operating range, they do not resemble a baitfish in their overall appearance, regardless of whether they are spinning or motionless. Spinner shape 42 not only has the overall appearance of a baitfish while rotating, but it also looks like a baitfish when it is motionless. Thus, a strike from a fish might be expected even if the lure was momentarily not being retrived.

FIGS. 3A and 3B depict an alternative embodiment of the present invention as may be utilized in assembly of an in-line spinning lure.

A spinner shape 52 is cut with straight lines instead of stylized as in FIG. 1A. The final in-line spinning lure 54 is depicted in FIG. 3B.

Figure 4:
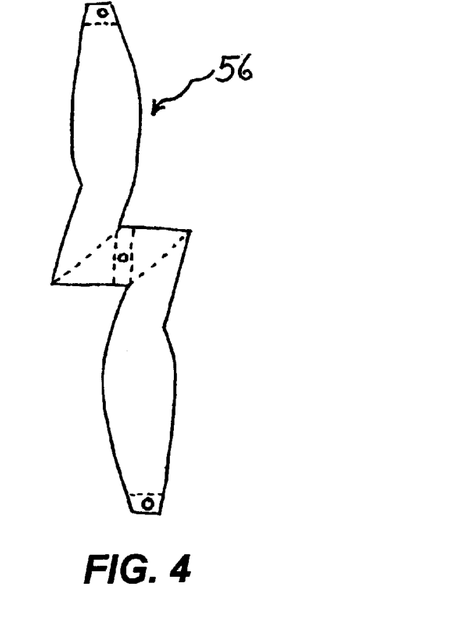
FIG. 4 depicts an alternative embodiment of the present invention as may be utilized for in-line spinning lures.

FIG. 4 depicts an alternative embodiment of the present invention as may be utilized in assembly of an in-line spinning lure.

A spinner shape 56 is cut and stylized to resemble the shape of a more elongated and slim bait fish, somewhat like the shape of a small minnow. The balance of the assembly is then identical to assembly of the preferred embodiment.

Figure 5:
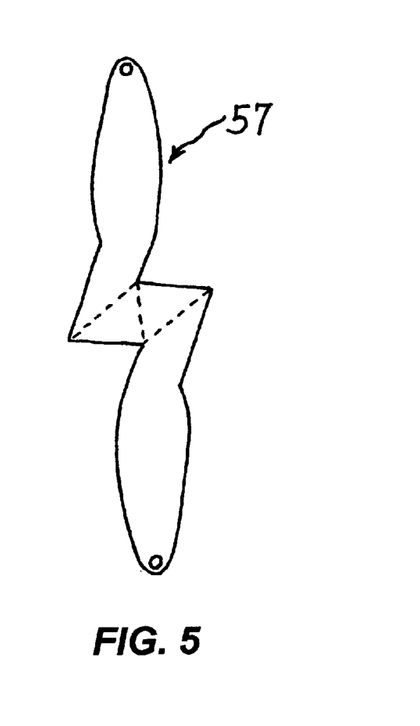
FIG. 5 depicts an alternative embodiment of the present invention as may be utilized for spinner baits and jig spinners.

FIG. 5 depicts an alternative embodiment of the present invention as may be utilized in assembly of spinner bait or jig spinner.

A spinner shape 57 is cut and stylized to resemble the shape of a more elongated and slim bait fish, somewhat like the shape of a small minnow. The balance of the assembly is then identical to assembly of the preferred embodiment.

Figure 6A:
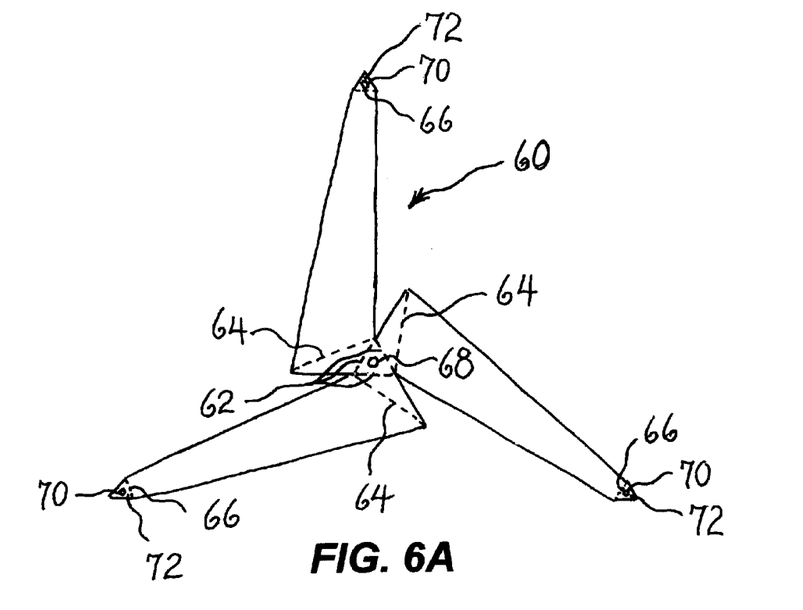
FIGS. 6A to 6C depict an alternative embodiment of the present invention as may be utilized for in-line spinners, spinner baits, and jig spinners.
Figure 6B:
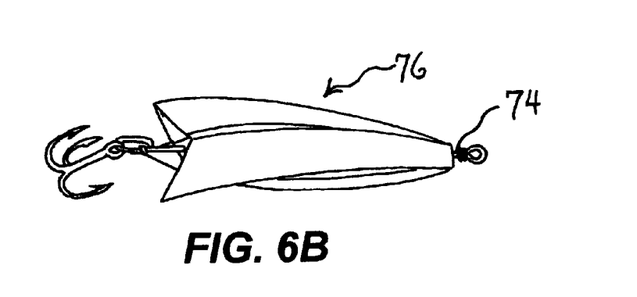
Figure 6C:
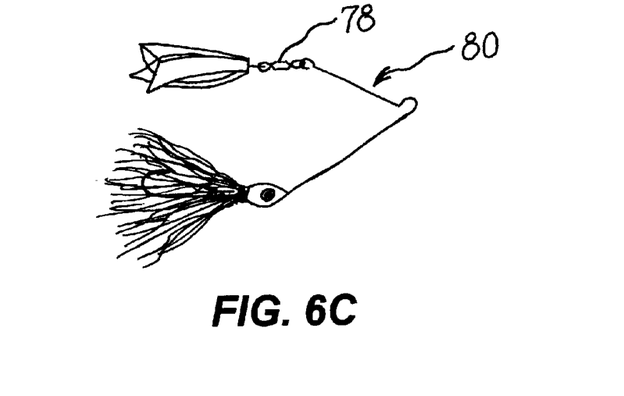

FIGS. 6A to 6C depict an alternative embodiment of the present invention as may be utilized in assembly of a spinner bait, jig spinner, or in-line spinning lure.

This embodiment is created from a three bladed spinner shape 60, having center hole 68 and tab holes 70, and is very similar in construction to the embodiments described with two blades. The spinner shape 60 is then bent along angles at bead plate bends 62, fin plate bends 64, and tab bends 66. Bead plate bends 62 and tab bends 66 are made in a direction toward the viewer and fin plate bends 64 are made in a direction away from the viewer. Tabs 72 are brought together at the apex and either journaled on a shaft 74 as is depicted in FIG. 6B for an in-line spinning lure 76, or permanently joined by gluing, spot welding, or other methods, for attachement to a swivel 78 on a spinner bait 80 as depicted in FIG. 6C.

FIGS. 1–6 are only a few embodiments of the present invention. There exists a very broad range of spinning lures, jig spinners, and spinner baits that can be created from these basic illustrations and descriptions. For example, many styles, shapes, sizes, weights, and colors of in-line spinning lures can be created that will cover many fishing situations. In-line spinning lures are used for freshwater fish, including but not limited to, bream, trout, bass, walleye, pike, musky, salmon, steelhead, char, striped bass, white bass, hybrid bass, and doubtless many others. In-line spinning lures for saltwater applications are equally numerous, including lures for species such as albacore, tuna, salmon, pompano, flounder, weakfish, redfish, blue fish, stripers, and many others. Each of these, fresh and saltwater, may require use of an in-line spinning lure that varies in style, shape, size, weight, or color.

The numbers of different spinner baits that can be created for bass fishing is equally diverse. Millions of spinner baits, and for that matter, jig spinners are sold every year, and while basically all are designed in the standard "V" shape spinner bait style, they vary according to weight, size, shape, and a multitude of colors and flashy finishes. Many differ only subtly, but make a large difference to the fish and fisherman. From research conducted with the designs, it appears that an infinite range of sizes of spinner blades may be created to fill various fishing situations, and in each of those there exists literally thousands of different colors, styles, and shapes that will have specific fishing applications.

From the description above, it becomes evident that the present invention has a number of advantages:

The new spinner blades of the present invention will spin at a slower retrieval speed than conventional spinner blades, thus permitting "slow-roll" techniques to fish that require a slow presentation to draw a strike.

In-line spinning lures utilizing the new spinner blades will buzz when rapidly retrieved, will spin predictably when fished slowly, will spin and flutter on the fall, tend not to hang-up when retrieved through underwater structure and obstructions, and can be vertically "jigged" effectively without entanglement with the casting line.

The spinner blades may be manufactured from thinner metal than conventional spinner blades without sacrificing structural integrity due to the bending and curvilinear shape. Therefore they can be lighter and more efficient spinners.

The spinner blades resemble the actual shape of a bait fish when spinning and when not spinning, can be marked with authentic baitfish indicia, and when spinning, present the bait fish indicia in repetitive, strobe-like images as it revolves.

The spinner blades make it possible to achieve both presentations, "buzz" and "slow-roll, with the same lure.

The spinning function of the new spinner blades is predictable and not as effected by interference from moss, algae, grass, or twigs.

The spinner blades produce a pleasant tug against the line, thus making for better feel of the lure and the strike of a fish.

The spinner blades will spin predictably while the lure is falling through the water column after a cast. In addition, while the lure is falling through the water, the spinner will flutter, mimicking a wounded bait fish.

The spinner blades make possible a new appearance to which fish have not become sensitized by years of fishing. Many shapes, sizes and contours are possible with the new blades which resemble the shapes of many different types of baitfish from very skinny to very fat. Therefore, lures can be designed to match very specific fishing needs.

Thus the reader will see that the spinner baits, jig spinners and in-line spinning lures assembled with the spinner blades of the described invention provide an improvement to the existing art of fishing with spinners. Whereas in the past, a different spinner bait or spinning lure would have been needed to perform the basic techniques of buzzing, slow-rolling, or deep jigging, one lure will now perform all of the techniques. This provides a great deal of versatility for the angler who will many times wish to quickly change presentations for better success. In addition, the spinner blades of the invention more closely resemble the small fish that conventional spinner blades were designed to imitate. Therefore, in every instance, the angler who is using the spinner blades will find that his success in catching fish is improved. Furthermore, the spinner blades have additional advantages in that:

they will spin at a slower retrieval speed than conventional spinner blades, thus permitting "slow-roll" techniques to fish that require a slow presentation to draw a strike.

when used for in-line spinning lures they will buzz when rapidly retrieved, will spin predictably when fished slowly, will spin and flutter on the fall, tend not to hang-up when retrieved through underwater structure and obstructions, and can be vertically "jigged" effectively without entanglement with the casting line.

they may be manufactured from thinner metal than conventional spinner blades without sacrificing structural integrity due to the bending and curvilinear shape. Therefore they can be lighter and more efficient spinners.

the spinning function of the new spinner blades is predictable and not as effected by interference from moss, algae, grass, or twigs.

the spinner blades resemble the actual shape of a bait fish when spinning and when not spinning, can be marked with authentic baitfish indicia, and when spinning, present the bait fish indicia in repetitive, strobe-like images as it revolves.

they produce a pleasant tug against the line, thus making for better feel of the lure and the strike of a fish.

they will spin predictably while the lure is falling through the water column after a cast. In addition, while the lure is falling through the water, the spinner will flutter, mimicking a wounded bait fish.

they make possible a new appearance to which fish have not become sensitized by years of fishing.

While my above description contains many specificities, these should not be construed as limitations on the scope of the invention, but rather as an exemplification of one preferred embodiment thereof. Many other variations are possible. For example, this invention will enjoy the same efficiency while spinning in moving air, as in water. It is therefore likely to make an attractive windmill for a fisherman to hang in his yard or for a child to use as a wind toy. It is also possible to use the design as an efficient propeller for an electric generator that is towed behind a sailboat to charge batteries.

Accordingly, the scope of the invention should be determined not by the embodiments illustrated, but by the appended claims and their legal equivalents.

I claim:

1. A spinner, comprising:

a sheet having first and second body portions and a tail portion, said body portions having front and rear portions;

said tail portion being bent along a first line to form first and second tail portions, said first and second tail portions extending rearward from said first line;

said first body portion adjoining said first tail portion, said sheet being bent along a second line so that said first body portion extends forward from said second line;

said second body portion adjoining said second tail portion, said sheet being bent along a third line so that said second body portion extends forward from said third line; and said front portion of said first body portion being operatively connected to said front portion of said second body portion;

wherein said first and second body portions and said tail portion are formed from an integral sheet of material; and wherein:

said second line is substantially parallel to said third line; and said second line extends at an acute angle from said first line when said first, second and third lines are in a plane before shaping.

2. A lure, comprising:

first and second body portions having front and rear portions; and a tail portion having first, second and middle portions, said first tail portion adjoining said middle tail portion along a first line and extending rearward from said middle tail portion, said second tail portion adjoining said middle tail portion along a second line and extending rearward from said middle tail portion, said first body portion adjoining said first tail portion along a third line and extending forward from said first tail portion, and said second body portion adjoining said second tail portion along a fourth line and extending forward from said second tail portion, said front portion of said first body portion being operatively connected to said front portion of said second body portion;

wherein said first and second body portions and said tail portion are formed from an integral sheet of material; and wherein:

said first line is substantially parallel to said second line;

said third line is substantially parallel to said fourth line; and said third line extends at an acute angle from said first line when said first, second and third lines are in a plane before shaping.

3. The lure of claim 2, further comprising a shaft, said shaft passing through a first hole in said middle portion of said tail portion and passing through second and third holes formed in said front portions of said first and second body portions, respectively, said first and second body portions and said tail portion being rotatable about said shaft.

* * * * *